(12) United States Patent
Lee et al.

(10) Patent No.: US 9,762,821 B2
(45) Date of Patent: Sep. 12, 2017

(54) UNIT PIXEL OF IMAGE SENSOR, IMAGE SENSOR, AND COMPUTING SYSTEM HAVING THE SAME

(71) Applicant: Samsung Electronics Co., Ltd., Suwon-si (KR)

(72) Inventors: Kyung-Ho Lee, Suwon-si (KR); Hee-Sang Kwon, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 322 days.

(21) Appl. No.: 14/583,029

(22) Filed: Dec. 24, 2014

(65) Prior Publication Data
US 2016/0014353 A1 Jan. 14, 2016

(30) Foreign Application Priority Data
Jul. 14, 2014 (KR) .......................... 10-2014-0088219

(51) Int. Cl.
*H04N 5/335* (2011.01)
*H04N 5/347* (2011.01)
*H04N 5/378* (2011.01)
*H04N 5/355* (2011.01)

(52) U.S. Cl.
CPC ......... *H04N 5/347* (2013.01); *H04N 5/35554* (2013.01); *H04N 5/378* (2013.01)

(58) Field of Classification Search
CPC ........ H04N 5/335; H04N 5/343; H04N 5/347; H04N 5/369

USPC ........ 250/208.1, 214.1, 214 A; 348/300, 308
See application file for complete search history.

(56) References Cited

U.S. PATENT DOCUMENTS

| 7,791,010 B2 | 9/2010 | Abadeer |
| 8,570,412 B2 | 10/2013 | Yanagita et al. |
| 8,599,294 B2 | 12/2013 | Sa et al. |
| 2009/0053848 A1* | 2/2009 | Fan .................. H01L 27/14603 438/59 |
| 2012/0293696 A1 | 11/2012 | Tanaka |
| 2013/0012263 A1 | 1/2013 | Goto et al. |
| 2013/0119438 A1 | 5/2013 | Kim et al. |
| 2014/0001338 A1 | 1/2014 | Mabuchi et al. |
| 2014/0117204 A1* | 5/2014 | Ha ...................... H04N 5/3559 250/208.1 |

(Continued)

FOREIGN PATENT DOCUMENTS

| JP | 2009-81634 A | 4/2009 |
| JP | 2013-48410 A | 3/2013 |
| KR | 10-2007-0050576 A | 5/2007 |

(Continued)

*Primary Examiner* — Kevin Pyo
(74) *Attorney, Agent, or Firm* — Muir Patent Law, PLLC

(57) ABSTRACT

A unit pixel of an image sensor includes a charge generation unit, a signal generation unit, and a ground control transistor. The charge generation unit generates photo-charges in response to incident light and provides the photo-charges to a floating diffusion area in response to a transmission control signal. The signal generation unit generates an analog signal having a magnitude corresponding to an electrical potential of the floating diffusion area based on a reset control signal and a row selection signal. The ground control transistor is coupled between the floating diffusion area and a ground voltage, and is turned on in response to a ground control signal.

17 Claims, 14 Drawing Sheets

(56) References Cited

U.S. PATENT DOCUMENTS

2014/0374572 A1* 12/2014 Kim .................. H04N 5/3745
                   250/208.1

FOREIGN PATENT DOCUMENTS

| KR | 10-2012-0122165 A | 11/2012 |
|----|-------------------|---------|
| KR | 10-2013-0006137 A | 1/2013  |
| KR | 10-1246141 B      | 3/2013  |
| KR | 10-1248436 B      | 3/2013  |
| KR | 10-2013-0053601 A | 5/2013  |

* cited by examiner

FIG. 10A

| 1 B | 2 G | 3 B | 4 G |
|---|---|---|---|
| 5 G | 6 ▨ | 7 G | 8 R |
| 9 B | 10 ▨ | 11 B | 12 G |
| 13 G | 14 R | 15 G | 16 R |

FIG. 10B

| B<br>(1+3+9+11) | G<br>(2+4+12) |
|---|---|
| G<br>(5+7+13+15) | R<br>(8+14+16) |

FIG. 12

| B | g | b | g | B | g | b | g |
|---|---|---|---|---|---|---|---|
| G | R | G | r | G | R | G | r |
| b | g | B | g | b | g | B | g |
| G | r | G | R | G | r | G | R |
| B | g | b | g | B | g | b | g |
| G | R | G | r | G | R | G | r |
| b | g | B | g | b | g | B | g |
| G | r | G | R | G | r | G | R |

FIG. 13A

|  | C0 | C1 | C2 | C3 | C4 | C5 | C6 | C7 |
|---|---|---|---|---|---|---|---|---|
| R0 | 1 B | 2 g | 3 b | 4 g | 5 B | 6 g | 7 b | 8 g |
| R1 | 9 G | 10 R | 11 G | 12 r | 13 G | 14 R | 15 G | 16 r |
| R2 | 17 b | 18 g | 19 B | 20 g | 21 b | 22 g | 23 B | 24 g |
| R3 | 25 G | 26 r | 27 G | 28 R | 29 G | 30 r | 31 G | 32 R |
| R4 | 33 B | 34 g | 35 b | 36 g | 37 B | 38 g | 39 b | 40 g |
| R5 | 41 G | 42 R | 43 G | 44 r | 45 G | 46 R | 47 G | 48 r |
| R6 | 49 b | 50 g | 51 B | 52 g | 53 b | 54 g | 55 B | 56 g |
| R7 | 57 G | 58 r | 59 G | 60 R | 61 G | 62 r | 63 G | 64 R |

| B<br>(1+19) | g<br>(2+4+18+20) | b<br>(7+21) | g<br>(6+8+22+24) |
|---|---|---|---|
| G<br>(9+11+25+27) | R<br>(10+28) | G<br>(13+15+29+31) | r<br>(16+30) |
| b<br>(35+49) | g<br>(34+36+50+52) | B<br>(37+55) | g<br>(38+40+54+56) |
| G<br>(41+43+57+59) | r<br>(44+58) | G<br>(45+47+61+63) | R<br>(46+64) |

UNIT PIXEL OF IMAGE SENSOR, IMAGE SENSOR, AND COMPUTING SYSTEM HAVING THE SAME

CROSS-REFERENCE TO RELATED APPLICATION(S)

This application claims priority under 35 USC §119 to Korean Patent Application No. 10-2014-0088219, filed on Jul. 14, 2014 in the Korean Intellectual Property Office (KIPO), the contents of which are herein incorporated by reference in their entirety.

BACKGROUND

This application relates to images sensors, a unit pixel of an image sensor, and a computing system including an image sensor. Generally, an image sensor detects incident light to generate an analog signal corresponding to the detected incident light using a unit pixel, and generates image data by converting the analog signal generated by the unit pixel to a digital signal.

Therefore, the amount of image data generated by the image sensor may increase as the number of the unit pixels included in the image sensor increases.

If the image data is too large, a high frame rate in a video mode may not be maintained and power consumption may increase.

Therefore, a pixel binning technique, which generates one binning pixel data using pixel data of adjacent unit pixels, may be used to reduce the size of the image data.

However, an image sensor may include various types of unit pixels that generate analog signals in response to respective types of light signals in order to perform various kinds of functions.

Therefore, when the pixel binning is performed on pixel data of different types of unit pixels, the image data may be distorted.

SUMMARY

Some example embodiments are directed to provide a unit pixel of an image sensor that is activated or deactivated according to an operation mode.

Some example embodiments are directed to provide an image sensor including the unit pixel.

Some example embodiments are directed to provide a computing system including the image sensor.

According to example embodiments, a unit pixel of an image sensor may include a charge generation unit, a signal generation unit, and a ground control transistor. The charge generation unit may generate photo-charges in response to incident light, and may provide the photo-charges to a floating diffusion area in response to a transmission control signal. The signal generation unit may generate an analog signal having a magnitude corresponding to an electrical potential of the floating diffusion area based on a reset control signal and a row selection signal. The ground control transistor may be coupled between the floating diffusion area and a ground voltage, and may be turned on in response to a ground control signal.

In example embodiments, the signal generation unit may include a reset transistor including a source coupled to the floating diffusion area, a drain coupled to a reset voltage that is higher than the ground voltage, and a gate configured to receive the reset control signal, a drive transistor including a source, a drain coupled to a supply voltage, and a gate coupled to the floating diffusion area, and a row selection transistor including a drain coupled to the source of the drive transistor, a gate configured to receive the row selection signal, and a source configured to output the analog signal.

The reset voltage may correspond to the supply voltage.

The ground control transistor may be turned off in a first operation mode, and may be turned on in a second operation mode.

The drive transistor may be turned on, and the row selection transistor may output the analog signal in the first operation mode. The drive transistor may be turned off, and the source of the row selection transistor may be floated in the second operation mode.

The reset control signal and the transmission control signal may be activated successively, and the ground control signal may be maintained in a deactivated state in the first operation mode. The ground control signal may be maintained in an activated state after the reset control signal is activated, and then deactivated in the second operation mode.

In example embodiments, the charge generation unit may include a photoelectric conversion unit configured to generate the photo-charges in response to the incident light and to provide the photo-charges to a first node, and a transmission transistor including a source coupled to the first node, a drain coupled to the floating diffusion area and a gate configured to receive the transmission control signal.

In example embodiments, the charge generation unit may include a first photoelectric conversion unit configured to generate the photo-charges in response to the incident light and to provide the photo-charges to a first node, a first transmission transistor including a source coupled to the first node, a drain coupled to the floating diffusion area and a gate configured to receive a first transmission control signal, a second photoelectric conversion unit configured to generate the photo-charges in response to the incident light and to provide the photo-charges to a second node, and a second transmission transistor including a source coupled to the second node, a drain coupled to the floating diffusion area and a gate configured to receive a second transmission control signal.

According to example embodiments, an image sensor may include a pixel array, an analog-to-digital conversion unit, and a control unit. The pixel array may include a plurality of unit pixels arranged in rows and columns, each of which generates an analog signal corresponding to incident light. The analog-to-digital conversion unit may convert the analog signal to a digital signal. The control unit may control operations of the pixel array and the analog-to-digital conversion unit. Each of the plurality of unit pixels may include a charge generation unit configured to generate photo-charges in response to the incident light and to provide the photo-charges to a floating diffusion area in response to a transmission control signal, a signal generation unit configured to generate the analog signal having a magnitude corresponding to an electrical potential of the floating diffusion area based on a reset control signal and a row selection signal, and a ground control transistor coupled between the floating diffusion area and a ground voltage. The ground control transistor may be configured to provide the ground voltage to the floating diffusion area when turned on.

In example embodiments, the signal generation unit may include a reset transistor including a source coupled to the floating diffusion area, a drain coupled to a reset voltage that is higher than the ground voltage and a gate configured to receive the reset control signal, a drive transistor including a source, a drain coupled to a supply voltage and a gate coupled to the floating diffusion area, and a row selection transistor including a drain coupled to the source of the drive transistor, a gate configured to receive the row selection signal and a source configured to output the analog signal.

In example embodiments, the plurality of unit pixels may include a plurality of first unit pixels and a plurality of second unit pixels. A gate of the ground control transistor included in each of the plurality of first unit pixels may be coupled to the ground voltage, and a gate of the ground control transistor included in each of the plurality of second unit pixels may receive a ground control signal.

The plurality of first unit pixels may include green pixels, red pixels and blue pixels that are arranged in a Bayer pattern, and the plurality of second unit pixels may include autofocus pixels that generate autofocus data.

The plurality of first unit pixels may include green pixels, red pixels and blue pixels that are arranged in a Bayer pattern, and the plurality of second unit pixels may include infrared pixels that operate in response to an infrared light signal.

In a first operation mode, the control unit may deactivate the ground control signal, and the ground control transistor included in each of the plurality of second unit pixels may be turned off in response to the deactivated ground control signal. In a second operation mode, the control unit may activate the ground control signal, and the ground control transistor included in each of the plurality of second unit pixels may be turned on in response to the activated ground control signal.

The first operation mode may correspond to a full image mode, and the second operation mode may correspond to a binning mode in which the image sensor performs a binning operation on neighboring unit pixels of the same color.

In example embodiments, the plurality of unit pixels may be arranged in a Bayer pattern. The plurality of unit pixels may include a plurality of long exposure unit pixels having a relatively long exposure time and a plurality of short exposure unit pixels having a relatively short exposure time. The plurality of long exposure unit pixels and the plurality of short exposure unit pixels may be arranged in a mosaic pattern in the pixel array.

Two unit pixels from the plurality of unit pixels that are adjacent in a column direction may share the floating diffusion area, the signal generation unit and the ground control transistor. A gate of the ground control transistor may be coupled to the ground voltage when the ground control transistor is shared by two unit pixels that are used in performing a two-by-two binning operation. A gate of the ground control transistor may receive a ground control signal when the ground control transistor is shared by a unit pixel that is used in performing the two-by-two binning operation and by a unit pixel that is unused in performing the two-by-two binning operation.

The pixel array may provide the analog-to-digital conversion unit with the analog signals generated by unit pixels located in even columns of the pixel array and with the analog signals generated by unit pixels located in odd columns of the pixel array alternately.

When performing the two-by-two binning operation, the control unit may provide the ground control signal having an activated state to unit pixels located in even columns of even rows of the pixel array and to unit pixels located in odd columns of odd rows of the pixel array, and provide the ground control signal having a deactivated state to unit pixels located in odd columns of even rows of the pixel array and to unit pixels located in even columns of odd rows of the pixel array.

According to example embodiments, a computing system may include an image sensor, a storage device and a processor. The image sensor may generate a digital signal corresponding to incident light. The storage device may store the digital signal. The processor may control operations of the image sensor and the storage device. The image sensor may include a pixel array, an analog-to-digital conversion unit, and a control unit. The pixel array may include a plurality of unit pixels arranged in rows and columns, each of which generates an analog signal corresponding to the incident light. The analog-to-digital conversion unit may convert the analog signal to the digital signal. The control unit may control operations of the pixel array and the analog-to-digital conversion unit. Each of the plurality of unit pixels may include a charge generation unit configured to generate photo-charges in response to the incident light and to provide the photo-charges to a floating diffusion area in response to a transmission control signal, a signal generation unit configured to generate the analog signal having a magnitude corresponding to an electrical potential of the floating diffusion area based on a reset control signal and a row selection signal, and a ground control transistor coupled between the floating diffusion area and a ground voltage. The ground control transistor may be configured to provide the ground voltage to the floating diffusion area when turned on.

BRIEF DESCRIPTION OF THE DRAWINGS

Illustrative, non-limiting example embodiments will be more clearly understood from the following detailed description in conjunction with the accompanying drawings.

FIGS. 10A and 10B are diagrams describing an exemplary operation of an image sensor of FIG. 6 in a second operation mode.

FIG. 12 is a diagram illustrating an example of a pixel array included in an image sensor of FIG. 11.

FIGS. 13A and 13B are diagrams describing an exemplary operation of an image sensor of FIG. 11 in a second operation mode.

DETAILED DESCRIPTION

Figure 1:
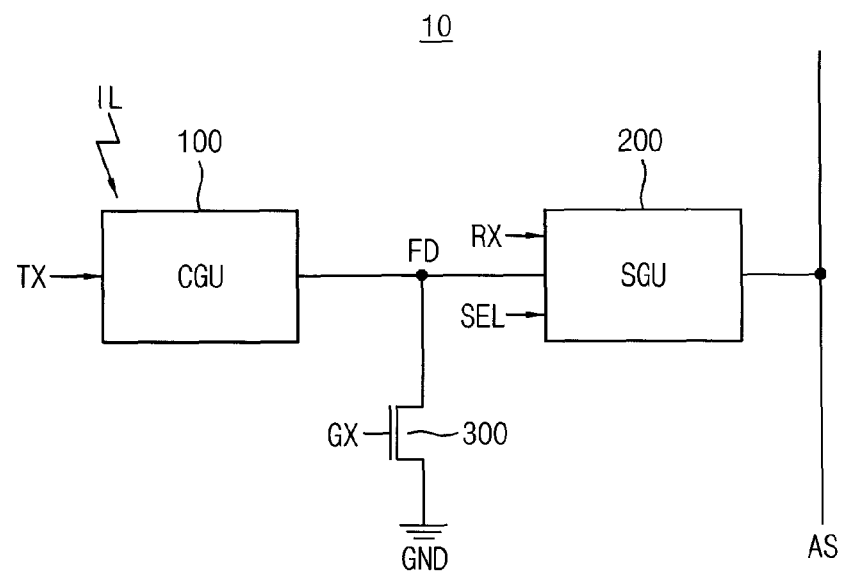
FIG. 1 is a block diagram illustrating a unit pixel of an image sensor according to example embodiments.

Various example embodiments will be described more fully with reference to the accompanying drawings, in which some example embodiments are shown. The present disclosure may, however, be embodied in many different forms and should not be construed as limited to the embodiments set forth herein. Like reference numerals refer to like elements throughout this application.

It will be understood that, although the terms first, second, etc. may be used herein to describe various elements, these elements should not be limited by these terms. Unless the context indicates otherwise, these terms are merely used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, or as "contacting" another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a unit pixel of an image sensor according to example embodiments.

Referring to FIG. 1, a unit pixel 10 may include a charge generation unit CGU 100, a signal generation unit SGU 200 and a ground control transistor 300. Each of the charge generation unit CGU 100 and the signal generation unit SGU 200 may include various circuitry, as discussed in greater detail below, and therefore may be referred to respectively as a charge generation circuit and signal generation circuit.

The charge generation unit 100 may generate photo-charges in response to incident light IL thereon, and may provide the photo-charges to a floating diffusion area FD in response to a transmission control signal TX. For example, an amount of the photo-charges generated by the charge generation unit 100 may correspond to an intensity of the incident light IL, and the charge generation unit 100 may provide the photo-charges to the floating diffusion area FD when the transmission control signal TX is activated.

The signal generation unit 200 may generate an analog signal AS having a magnitude corresponding to an electrical potential of the floating diffusion area FD based on a reset control signal RX and a row selection signal SEL. Since the electrical potential of the floating diffusion area FD changes based on an amount of the photo-charges transmitted to the floating diffusion area FD from the charge generation unit 100, the magnitude of the analog signal AS generated by the signal generation unit 200 may correspond to the intensity of the incident light IL.

The ground control transistor 300 may be coupled between the floating diffusion area FD and a ground voltage GND. The ground control transistor 300 may include a gate receiving a ground control signal GX. Therefore, the ground control transistor 300 may be turned on in response to the ground control signal GX.

In some example embodiments, the ground control transistor 300 may be turned off in a first operation mode and may be turned on in a second operation mode.

When the ground control transistor 300 is turned off in the first operation mode, the ground control transistor 300 may disconnect the floating diffusion area FD from the ground voltage GND. When the ground control transistor 300 is turned on in the second operation mode, the ground control transistor 300 may provide the ground voltage GND to the floating diffusion area FD.

In some example embodiments, the ground control transistor 300 may be an n-type metal oxide semiconductor (NMOS) transistor.

In some example embodiments, a plurality of the unit pixels 10 may form a pixel array of an image sensor.

Figure 2:
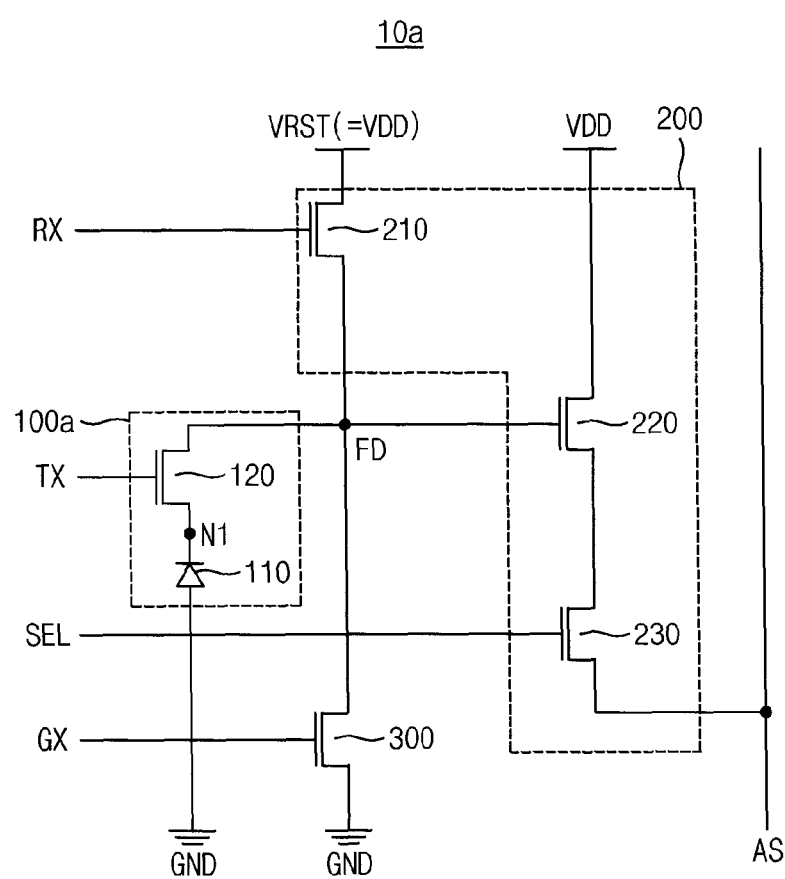
FIG. 2 is a circuit diagram illustrating an example of a unit pixel of FIG. 1.

FIG. 2 is a circuit diagram illustrating an example of a unit pixel of FIG. 1.

Referring to FIG. 2, a unit pixel 10a may include a charge generation unit 100a, the signal generation unit 200 and the ground control transistor 300.

The charge generation unit 100a may include a circuit including a photoelectric conversion unit 110 and a transmission transistor 120.

The photoelectric conversion unit 110 may be a circuit that detects the incident light IL, and generates the photo-charges in response to the incident light IL. An amount of the photo-charges generated by the photoelectric conversion unit 110 may correspond to an intensity of the incident light IL. The photoelectric conversion unit 110 may provide the photo-charges to a first node N1. In some example embodiments, the photoelectric conversion unit 110 may include a photodiode.

The transmission transistor 120 may include a source coupled to the first node N1, a drain coupled to the floating diffusion area FD, and a gate receiving the transmission control signal TX. When the transmission transistor 120 is turned off, the photo-charges generated by the photoelectric conversion unit 110 may be accumulated in the first node N1. When the transmission transistor 120 is turned on, the transmission transistor 120 may transfer the photo-charges from the first node N1 to the floating diffusion area FD.

In some example embodiments, the transmission transistor 120 may be an NMOS transistor.

The signal generation unit 200 may be a circuit that includes a reset transistor 210, a drive transistor 220, and a row selection transistor 230.

The reset transistor 210 may include a source coupled to the floating diffusion area FD, a drain coupled to a reset voltage VRST, and a gate configured to receive the reset control signal RX. The reset voltage VRST may be higher than the ground voltage GND. In some example embodiments, the reset voltage VRST may be a supply voltage VDD. Hereinafter, the reset voltage VRST may be described as the supply voltage VDD.

The drive transistor 220 may include a source coupled to a drain of the row selection transistor 230, a drain coupled to the supply voltage VDD, and a gate coupled to the floating diffusion area FD.

The row selection transistor 230 may include a drain coupled to the source of the drive transistor 220, a gate receiving the row selection signal SEL, and a source outputting the analog signal AS.

In some example embodiments, the reset transistor 210, the drive transistor 220, and the row selection transistor 230 may be NMOS transistors.

The unit pixel 10 may be activated in the first operation mode such that the unit pixel 10 may output the analog signal AS. The unit pixel 10 may be deactivated in the second operation mode such that the unit pixel 10 does not output the analog signal AS.

Figure 3:
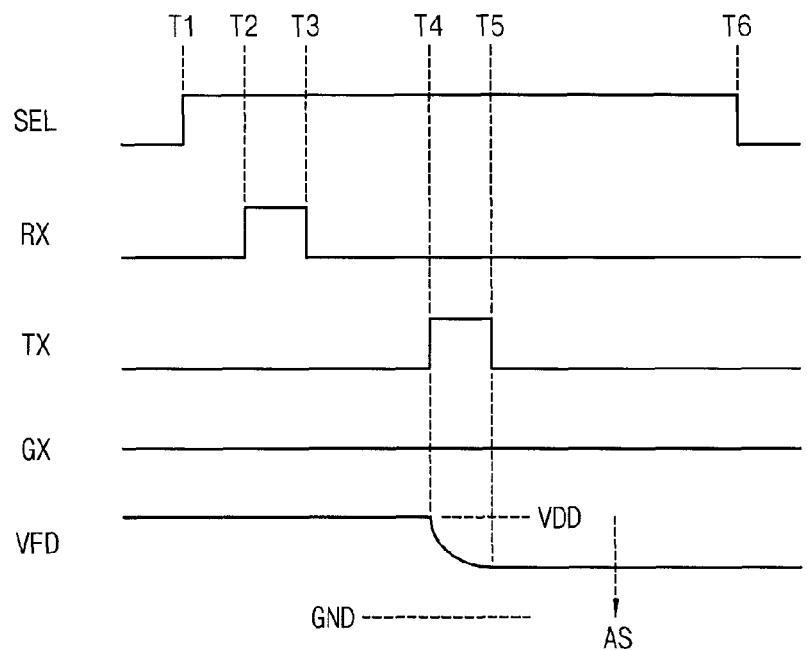
FIG. 3 is a timing diagram describing an exemplary operation of a unit pixel of FIG. 2 in a first operation mode.

FIG. 3 is a timing diagram describing an operation of a unit pixel of FIG. 2 in a first operation mode.

Referring to FIG. 3, the ground control signal GX may be maintained in a logic low level in the first operation mode.

Therefore, the ground control transistor 300 may be maintained in a turned off state in the first operation mode such that the floating diffusion area FD may be disconnected from the ground voltage GND.

At a first time T1, the row selection signal SEL, which is provided to the gate of the row selection transistor 230, is activated to a logic high level such that the row selection transistor 230 is turned on. Therefore, the unit pixel 10 may be selected. At this time, the transmission control signal TX is maintained in the logic low level such that the transmission transistor 120 is turned off. Therefore, the photo-charges generated by the photoelectric conversion unit 110 may be accumulated in the first node N1.

At a second time T2, the reset control signal RX, which is provided to the gate of the reset transistor 210, is activated to the logic high level such that the reset transistor 210 is turned on. Therefore, the photo-charges stored in the floating diffusion area FD are discharged to the supply voltage VDD through the reset transistor 210. As such, a voltage VFD of the floating diffusion area FD may be maintained at the supply voltage VDD.

At a third time T3, the reset control signal RX, which is provided to the gate of the reset transistor 210, is deactivated to the logic low level such that the reset transistor 210 is turned off. Therefore, the floating diffusion area FD may be disconnected from the ground voltage GND.

At a fourth time T4, the transmission control signal TX, which is provided to the gate of the transmission transistor 120, is activated to the logic high level such that the transmission transistor 120 is turned on. Therefore, the photo-charges accumulated in the first node N1 may be transferred to the floating diffusion area FD through the transmission transistor 120. The voltage VFD of the floating diffusion area FD, which corresponds to the gate of the drive transistor 220, may change based on an amount of the photo-charges transferred to the floating diffusion area FD.

For example, as illustrated in FIG. 3, the voltage VFD of the floating diffusion area FD may decrease from the supply voltage VDD as the amount of the photo-charges transferred to the floating diffusion area FD increases.

At a fifth time T5, the transmission control signal TX, which is provided to the gate of the transmission transistor 120, is deactivated to the logic low level such that the transmission transistor 120 is turned off. Therefore, the photo-charges may not be transferred from the first node N1 to the floating diffusion area FD such that the voltage VFD of the floating diffusion area FD may be maintained constantly after the fifth time T5.

After the fifth time T5, the drive transistor 220 may be turned on based on the voltage VFD of the floating diffusion area FD, and the row selection transistor 230 may be turned on in response to the row selection signal SEL maintained in the logic high level. Therefore, the row selection transistor 230 may output the analog signal AS having a magnitude corresponding to the voltage VFD of the floating diffusion area FD.

At a sixth time T6, the row selection signal SEL, which is provided to the gate of the row selection transistor 230, is deactivated to the logic low level such that the row selection transistor 230 is turned off. Therefore, the selection of the unit pixel 10 may be released.

As described above with reference to FIG. 3, in the first operation mode, the ground control signal GX is maintained in a deactivated state while the reset control signal RX and the transmission control signal TX are activated successively. Therefore, the drive transistor 220 may be turned on based on a strength corresponding to the voltage VFD of the floating diffusion area FD. As such, the row selection transistor 230 may output the analog signal AS having a magnitude corresponding to the intensity of the incident light IL.

Figure 4:
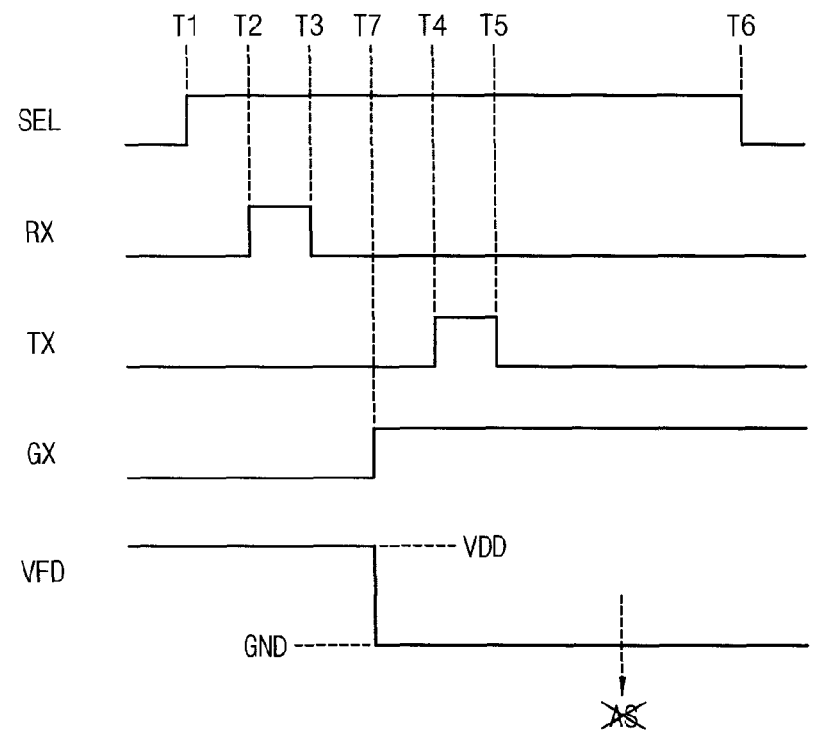
FIG. 4 is a timing diagram describing an exemplary operation of a unit pixel of FIG. 2 in a second operation mode.

FIG. 4 is a timing diagram describing an operation of a unit pixel of FIG. 2 in a second operation mode.

Referring to FIG. 4, at a first time T1, the row selection signal SEL, which is provided to the gate of the row selection transistor 230, is activated to the logic high level such that the row selection transistor 230 is turned on. Therefore, the unit pixel 10 may be selected. At this time, the transmission control signal TX is maintained in the logic low level such that the transmission transistor 120 is turned off. Therefore, the photo-charges generated by the photoelectric conversion unit 110 may be accumulated in the first node N1.

At a second time T2, the reset control signal RX, which is provided to the gate of the reset transistor 210, is activated to the logic high level such that the reset transistor 210 is turned on. Therefore, the photo-charges stored in the floating diffusion area FD may be discharged to the supply voltage VDD through the reset transistor 210. As such, a voltage VFD of the floating diffusion area FD may be maintained at the supply voltage VDD.

At a third time T3, the reset control signal RX, which is provided to the gate of the reset transistor 210, is deactivated to the logic low level such that the reset transistor 210 is turned off. Therefore, the floating diffusion area FD may be disconnected from the ground voltage GND.

At a seventh time T7, the ground control signal GX, which is provided to the gate of the ground control transistor 300, is activated to the logic high level such that the ground control transistor 300 is turned on. As illustrated in FIG. 4, since the ground control signal GX is maintained in the logic high level after the seventh time T7, the ground control transistor 300 may be maintained in a turned on state after the seventh time T7.

Therefore, the voltage VFD of the floating diffusion area FD may be maintained at the ground voltage GND after the seventh time T7 although the transmission control signal TX is activated to the logic high level such that the photo-charges accumulated in the first node N1 can be transferred to the floating diffusion area FD through the transmission transistor 120.

At a sixth time T6, the row selection signal SEL, which is provided to the gate of the row selection transistor 230, is deactivated to the logic low level such that the row selection transistor 230 is turned off. Therefore, the selection of the unit pixel 10 may be released.

As described above with reference to FIG. 4, in the second operation mode, the drive transistor 220 may be turned off after the seventh time T7 since the voltage VFD of the floating diffusion area FD is maintained at the ground voltage GND after the seventh time T7. As such, the row selection transistor 230 may not output the analog signal AS, and the source of the row selection transistor 230 may be floated in the second operation mode.

Figure 5:
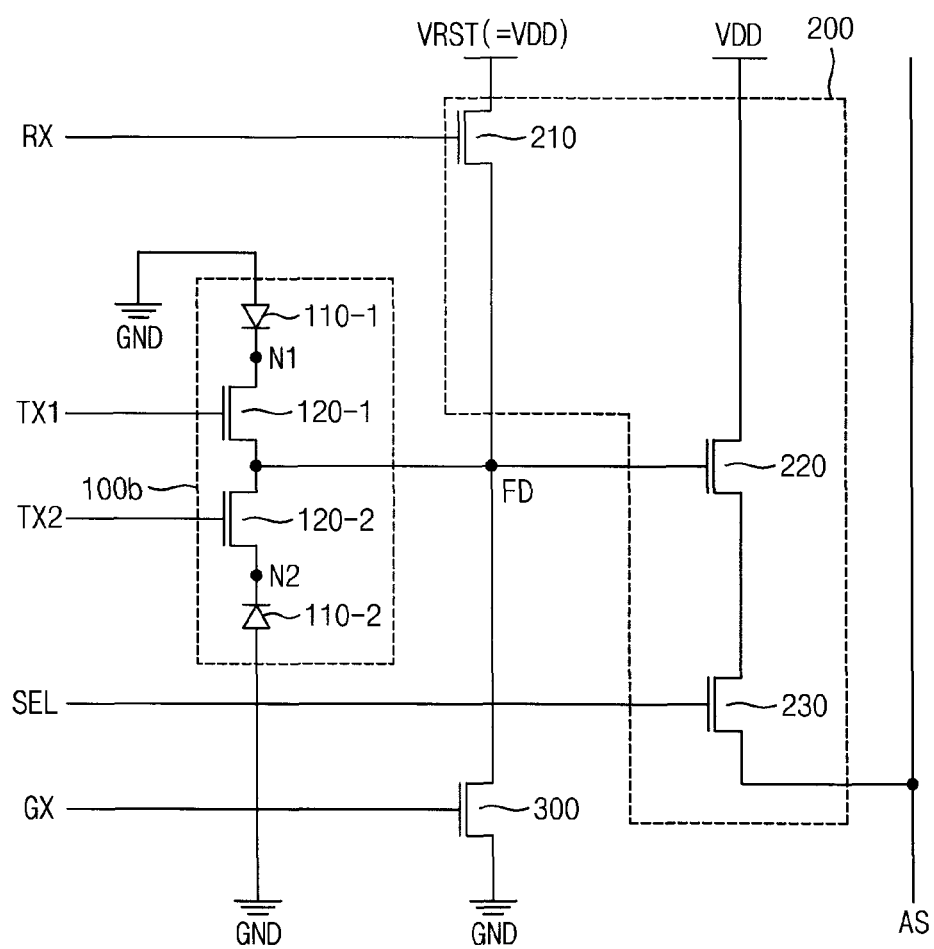
FIG. 5 is a circuit diagram illustrating another example of a unit pixel of FIG. 1.

FIG. 5 is a circuit diagram illustrating another example of a unit pixel of FIG. 1.

Referring to FIG. 5, a unit pixel 10b may include a charge generation unit 100b, the signal generation unit 200 and the ground control transistor 300.

The signal generation unit 200 and the ground control transistor 300 included in the unit pixel 10b of FIG. 5 may be the same as the signal generation unit 200 and the ground control transistor 300 included in the unit pixel 10a of FIG. 2, respectively.

The transmission control signal TX may include a first transmission control signal TX1 and a second transmission control signal TX2.

The charge generation unit 100b may include a circuit that includes a first photoelectric conversion unit 110-1, a second photoelectric conversion unit 110-2, a first transmission transistor 120-1, and a second transmission transistor 120-2.

The first photoelectric conversion unit 110-1 may include a circuit that detects the incident light IL, and generates the photo-charges in response to the incident light IL. An amount of the photo-charges generated by the first photoelectric conversion unit 110-1 may correspond to an intensity of the incident light IL. The first photoelectric conversion unit 110-1 may provide the photo-charges to a first node N1.

The first transmission transistor 120-1 may include a source coupled to the first node N1, a drain coupled to the floating diffusion area FD, and a gate receiving the first transmission control signal TX1. When the first transmission transistor 120-1 is turned off, the photo-charges generated by the first photoelectric conversion unit 110-1 may be accumulated in the first node N1. When the first transmission transistor 120-1 is turned on, the first transmission transistor 120-1 may transfer the photo-charges from the first node N1 to the floating diffusion area FD.

The second photoelectric conversion unit 110-2 may include a circuit that detects the incident light IL, and generates the photo-charges in response to the incident light IL. An amount of the photo-charges generated by the second photoelectric conversion unit 110-2 may correspond to an intensity of the incident light IL. The second photoelectric conversion unit 110-2 may provide the photo-charges to a second node N2.

The second transmission transistor 120-2 may include a source coupled to the second node N2, a drain coupled to the floating diffusion area FD, and a gate receiving the second transmission control signal TX2. When the second transmission transistor 120-2 is turned off, the photo-charges generated by the second photoelectric conversion unit 110-2 may be accumulated in the second node N2. When the second transmission transistor 120-2 is turned on, the second transmission transistor 120-2 may transfer the photo-charges from the second node N2 to the floating diffusion area FD.

In some example embodiments, each of the first photoelectric conversion unit 110-1 and the second photoelectric conversion unit 110-2 may include a photodiode.

In some example embodiments, each of the first transmission transistor 120-1 and the second transmission transistor 120-2 may be an NMOS transistor.

As illustrated in FIG. 5, the first photoelectric conversion unit 110-1 and the second photoelectric conversion unit 110-2 may share the floating diffusion area FD, the signal generation unit 200 and the ground control transistor 300.

The unit pixel 10b may perform the operations described above with reference to FIGS. 3 and 4 for the first photoelectric conversion unit 110-1 and the second photoelectric conversion unit 110-2 separately in different times. For example, the first transmission control signal TX1 and the second transmission control signal TX2 may be activated to the logic high level in different times such that the unit pixel 10b may output the analog signal AS generated based on the photo-charges generated by the first photoelectric conversion unit 110-1 and the analog signal AS generated based on the photo-charges generated by the second photoelectric conversion unit 110-2 independently.

In addition, the logic level of the ground control signal GX may be controlled during a period when the first transmission control signal TX1 is activated and during a period when the second transmission control signal TX2 is activated independently, such that the unit pixel 10b may control whether the unit pixel 10b outputs the analog signal AS generated based on the photo-charges generated by the first photoelectric conversion unit 110-1 and whether the unit pixel 10b outputs the analog signal AS generated based on the photo-charges generated by the second photoelectric conversion unit 110-2 independently.

As described above with reference to FIGS. 1 to 5, the unit pixel 10 according to example embodiments may include the ground control transistor 300 that is coupled between the floating diffusion area FD and the ground voltage GND, and is turned on in response to the ground control signal GX. Therefore, the unit pixel 10 may output the analog signal AS having a magnitude corresponding to the intensity of the incident light IL in the first operation mode, in which the ground control signal GX is activated. On the other hand, the unit pixel 10 may not output the analog signal AS in the second operation mode, in which the ground control signal GX is deactivated. As such, the unit pixel 10 may be activated or deactivated according to the operation mode.

Figure 6:
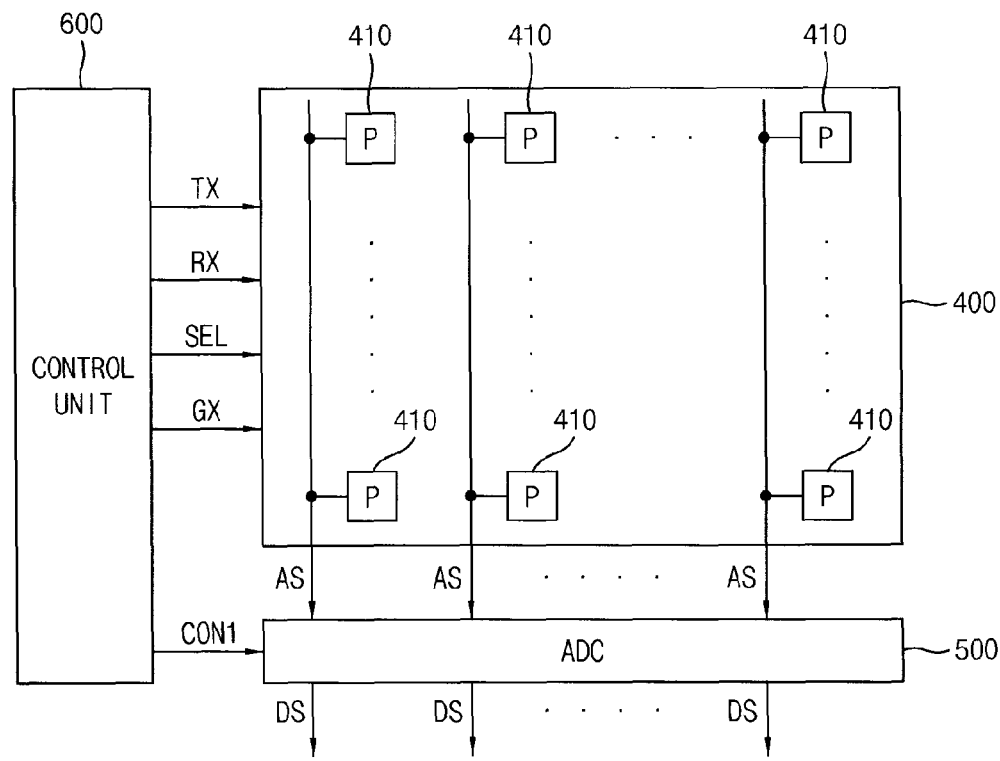
FIG. 6 is a block diagram illustrating an image sensor according to example embodiments.

FIG. 6 is a block diagram illustrating an image sensor according to example embodiments.

Referring to FIG. 6, an image sensor 20 may include a pixel array 400, an analog-to-digital conversion unit ADC 500 and a control unit 600.

The pixel array 400 may include a plurality of unit pixels P 410 arranged in rows and columns. Each of the plurality of unit pixels 410 may generate an analog signal AS having a magnitude corresponding to an intensity of incident light.

The analog-to-digital conversion unit 500 may convert the analog signal AS provided by each of the plurality of unit pixels 410 to a digital signal DS.

The control unit 600 may control an operation of the pixel array 400 using a row selection signal SEL, a reset control signal RX, a transmission control signal TX and a ground control signal GX. The control unit 600 may control an operation of the analog-to-digital conversion unit 500 using a control signal CON1.

Figure 7:
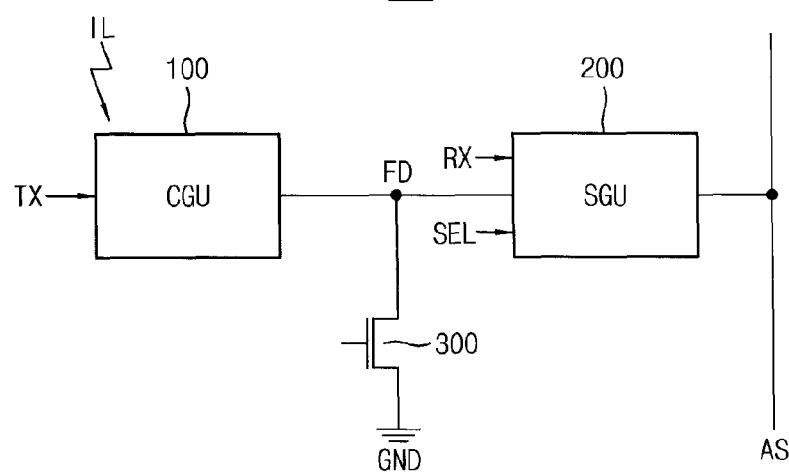
FIGS. 7 to 9 are block diagrams illustrating examples of a unit pixel included in an image sensor of FIG. 6.
Figure 8:
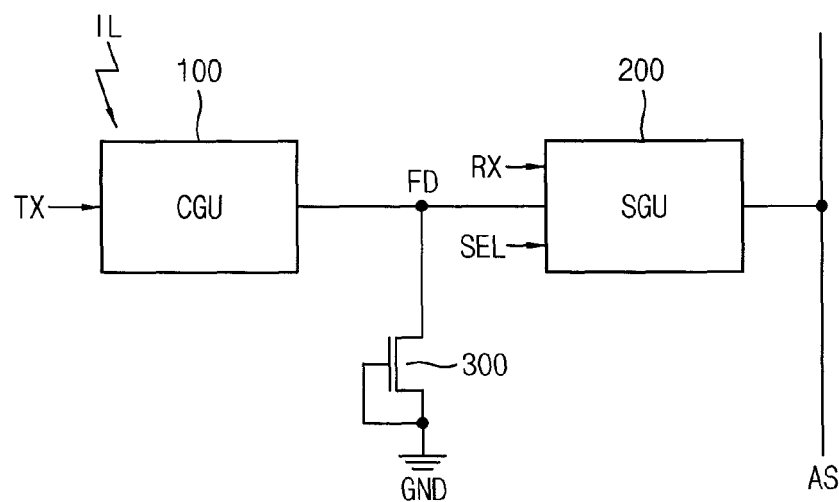
Figure 9:
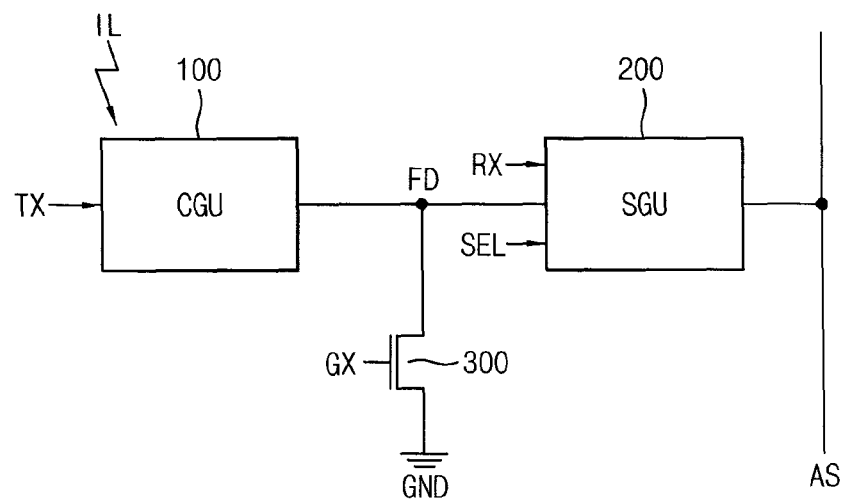

FIGS. 7 to 9 are block diagrams illustrating examples of a unit pixel included in an image sensor of FIG. 6.

Referring to FIG. 7, the unit pixel 410 may include a charge generation unit CGU 100, a signal generation unit SGU 200 and a ground control transistor 300.

The charge generation unit 100 may include a circuit that generates photo-charges in response to the incident light IL thereon, and may provide the photo-charges to a floating diffusion area FD in response to the transmission control signal TX. For example, an amount of the photo-charges generated by the charge generation unit 100 may correspond to an intensity of the incident light IL, and the charge generation unit 100 may provide the photo-charges to the floating diffusion area FD when the transmission control signal TX is activated.

The signal generation unit 200 may include a circuit that generates the analog signal AS having a magnitude corresponding to an electrical potential of the floating diffusion area FD based on the reset control signal RX and the row selection signal SEL. Since the electrical potential of the floating diffusion area FD changes based on an amount of the photo-charges transmitted to the floating diffusion area FD from the charge generation unit 100, the magnitude of the analog signal AS generated by the signal generation unit 200 may correspond to the intensity of the incident light IL.

The charge generation unit 100 and the signal generation unit 200 included in the unit pixel 410 of FIG. 7 may be the same as the charge generation unit 100*a* and the signal generation unit 200 included in the unit pixel 10*a* of FIG. 2.

The ground control transistor 300 may be coupled between the floating diffusion area FD and a ground voltage GND.

When the ground control transistor 300 is turned off, the ground control transistor 300 may disconnect the floating diffusion area FD from the ground voltage GND. When the ground control transistor 300 is turned on, the ground control transistor 300 may provide the ground voltage GND to the floating diffusion area FD.

In some example embodiments, the plurality of unit pixels 410 included in the pixel array 400 may include a plurality of first unit pixels 410-1 and a plurality of second unit pixels 410-2. The plurality of second unit pixels 410-2 may be distributed among the plurality of first unit pixels 410-1.

The plurality of first unit pixels 410-1 may include color pixels that generate color data. For example, the plurality of first unit pixels 410-1 may include the green pixels, red pixels and blue pixels that are arranged in a Bayer pattern.

The plurality of second unit pixels 410-2 may include pixels that generate data different from the color data. In some example embodiments, the plurality of second unit pixels 410-2 may include autofocus pixels that generate autofocus data. In other example embodiments, the plurality of second unit pixels 410-2 may include infrared pixels that operate in response to an infrared light signal.

As illustrated in FIG. 8, a gate of the ground control transistor 300 included in each of the plurality of first unit pixels 410-1 may be coupled to the ground voltage GND. Therefore, the ground control transistor 300 included in each of the plurality of first unit pixels 410-1 may be maintained in a turned off state regardless of a logic level of the ground control signal GX.

As such, each of the plurality of first unit pixels 410-1 may perform an operation described above with reference to FIG. 3 in order to generate the analog signal AS having a magnitude corresponding to the intensity of the incident light IL regardless of the logic level of the ground control signal GX.

As illustrated in FIG. 9, a gate of the ground control transistor 300 included in each of the plurality of second unit pixels 410-2 may receive the ground control signal GX provided by the control unit 600. Therefore, the ground control transistor 300 included in each of the plurality of second unit pixels 410-2 may be turned on or turned off based on the logic level of the ground control signal GX.

As such, each of the plurality of second unit pixels 410-2 may be activated or deactivated based on the logic level of the ground control signal GX. For example, when the ground control signal GX is maintained in a deactivated state, each of the plurality of second unit pixels 410-2 may perform an operation described above with reference to FIG. 3 in order to generate the analog signal AS having a magnitude corresponding to the intensity of the incident light IL. On the other hand, when the ground control signal GX is activated, each of the plurality of second unit pixels 410-2 may perform an operation described above with reference to FIG. 4 such that each of the plurality of second unit pixels 410-2 does not generate the analog signal AS.

Referring again to FIG. 6, the image sensor 20 may operate in a first operation mode or in a second operation mode.

The first operation mode may correspond to a full image mode in which the image sensor 20 generates image data of a high quality, and the second operation mode may correspond to a binning mode in which the image sensor 20 performs a binning operation on neighboring unit pixels of the same color.

In the first operation mode, the control unit 600 may sequentially select one of the rows included in the pixel array 400, and may provide the unit pixels 410 included in the selected row with the row selection signal SEL, the reset control signal RX, the transmission control signal TX and the ground control signal GX according to the timing diagram of FIG. 3.

For example, in the first operation mode, the control unit 600 may maintain the ground control signal GX in the deactivated state, which corresponds to the logic low level. Therefore, the ground control transistor 300 included in each of the plurality of second unit pixels 410-2 may be turned off. Since the gate of the ground control transistor 300 included in each of the plurality of first unit pixels 410-1 is coupled to the ground voltage GND, the ground control transistor 300 included in each of the plurality of first unit pixels 410-1 may be maintained in the turned off state.

Therefore, in the first operation mode, each of the plurality of first unit pixels 410-1 and each of the plurality of second unit pixels 410-2 included in the selected row may generate the analog signal AS having a magnitude corresponding to the intensity of the incident light IL.

The analog-to-digital conversion unit 500 may perform an analog-to-digital conversion on the analog signals AS provided by the pixel array 400 in a unit of row in order to generate the digital signals DS.

In one embodiment, in the second operation mode, the image sensor 20 may perform the binning operation on neighboring unit pixels of the same color.

In some example embodiments, in order to perform the binning operation in the second operation mode, the control unit 600 may simultaneously select rows of the pixel array 400 including unit pixels 410 on which the binning operation is performed, and may provide unit pixels 410 included in the selected rows with the row selection signal SEL, the reset control signal RX, the transmission control signal TX and the ground control signal GX according to the timing diagram of FIG. 4.

For example, in the second operation mode, the control unit 600 may activate the ground control signal GX such that the ground control transistor 300 included in each of the plurality of second unit pixels 410-2 may be turned on. Since the gate of the ground control transistor 300 included in each of the plurality of first unit pixels 410-1 is coupled to the ground voltage GND, the ground control transistor 300 included in each of the plurality of first unit pixels 410-1 may be maintained in the turned off state.

Therefore, in the second operation mode, each of the plurality of first unit pixels 410-1 included in the selected rows may generate the analog signal AS having a magnitude corresponding to the intensity of the incident light IL while each of the plurality of second unit pixels 410-2 included in the selected rows does not generate the analog signal AS.

Since the rows including unit pixels 410 on which the binning operation is performed are selected at the same time in the second operation mode, an average value of the analog signals AS, which are generated by first unit pixels 410-1 that are included in the selected rows and are located in the same column, may be provided to the analog-to-digital conversion unit 500.

The analog-to-digital conversion unit 500 may generate the digital signal DS based on the average values received from columns of the pixel array 400 including the unit pixels 410 on which the binning operation is performed.

FIGS. 10A and 10B are diagrams describing an exemplary operation of an image sensor of FIG. 6 in a second operation mode.

In FIGS. 10A and 10B, a two-by-two (2*2) binning operation, which is performed on four neighboring pixels of the same color that are adjacent in a column direction and in a row direction of each other, is illustrated as an example.

In FIG. 10A, each number 1, 2, . . . , 16 in each unit pixel represents a pixel number.

As illustrated in FIG. 10A, the pixel array 400 may have a Bayer pattern in which a first type of row, on which a blue pixel B and a green pixel G are arranged alternately, and a second type of row, on which the green pixel G and a red pixel R are arranged alternately, are arranged alternately.

The blue pixel B, the green pixel G and the red pixel R may correspond to the first unit pixel 410-1. Therefore, the gate of the ground control transistor 300 included in each of the blue pixel B, the green pixel G and the red pixel R may be coupled to the ground voltage GND.

The plurality of second unit pixels 410-2 may be distributed among the blue pixel B, the green pixel G and the red pixel R. In FIG. 10A, unit pixels 6 and 10 may correspond to the second unit pixel 410-2.

As illustrated in FIG. 10B, when the two-by-two binning operation is performed on the pixel array 400 of FIG. 10A, one digital signal DS corresponding to a blue color may be generated by averaging the analog signals AS generated by four blue pixels 1, 3, 9, 11, and one digital signal DS corresponding to a green color may be generated by averaging the analog signals AS generated by four green pixels 5, 7, 13, 15.

Since the unit pixel 6 is not the red pixel R but corresponds to the second unit pixel 410-2, the digital signal DS may not represent a red color if the digital signal DS is generated by averaging the analog signals AS generated by four unit pixels 6, 8, 14, 16.

Similarly, since the unit pixel 10 is not the green pixel G but corresponds to the second unit pixel 410-2, the digital signal DS may not represent a green color if the digital signal DS is generated by averaging the analog signals AS generated by four unit pixels 2, 4, 10, 12.

As described above with reference to FIGS. 6 to 9, since the control unit 600 activates the ground control signal GX in the second operation mode, the ground control transistor 300 included in each of the plurality of second unit pixels 410-2 may be turned on in the second operation mode. Therefore, each of the plurality of second unit pixels 410-2 may not generate the analog signal AS. As such, the image sensor 20 may perform the binning operation using the analog signals AS generated by the plurality of first unit pixels 410-1 without the analog signals AS generated by the plurality of second unit pixels 410-2.

For example, as illustrated in FIG. 10B, the image sensor 20 may generate one digital signal DS corresponding to a red color by averaging the analog signals AS generated by three red pixels 8, 14, 16 since the unit pixel 6, which corresponds to the second unit pixel 410-2, does not generate the analog signal AS. Similarly, the image sensor 20 may generate one digital signal DS corresponding to a green color by averaging the analog signals AS generated by three green pixels 2, 4, 12 since the unit pixel 10, which corresponds to the second unit pixel 410-2, does not generate the analog signal AS.

As described above with reference to FIGS. 6 to 10B, since the plurality of second unit pixels 410-2, which are not used in performing the binning operation in the second operation mode, does not generate the analog signal AS, the image sensor 20 according to example embodiments may effectively perform the binning operation in the second operation mode.

Figure 11:
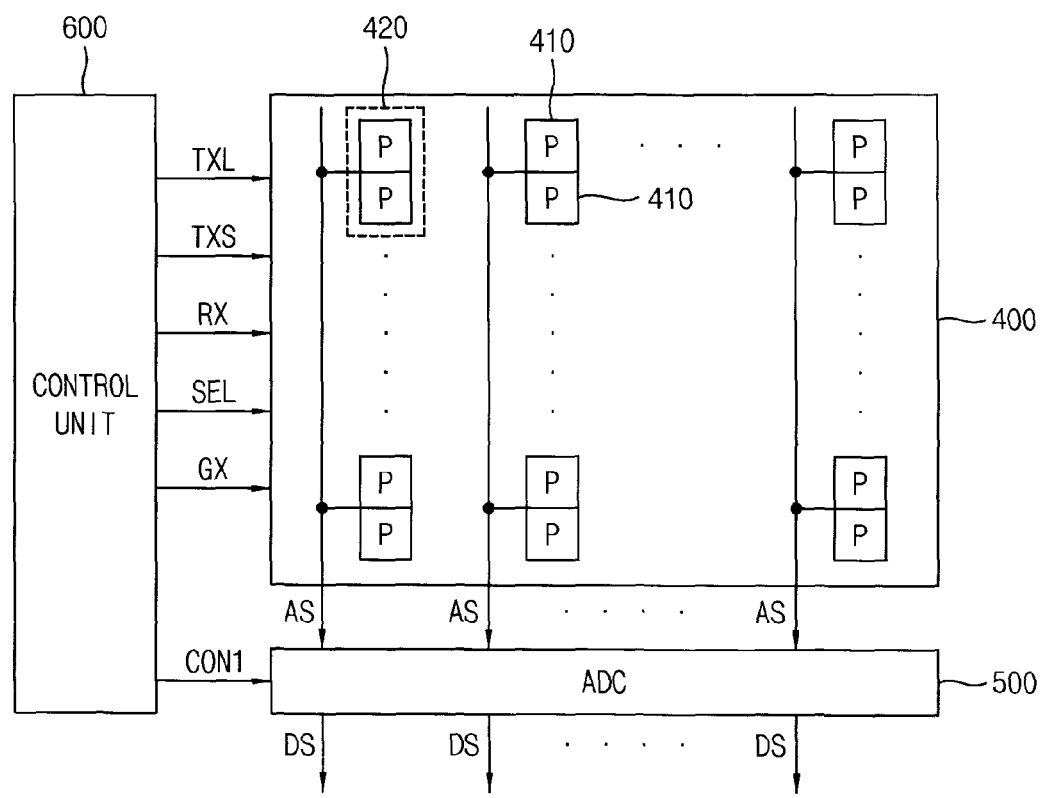
FIG. 11 is a block diagram illustrating an image sensor according to example embodiments.

FIG. 11 is a block diagram illustrating an image sensor according to example embodiments.

Referring to FIG. 11, an image sensor 30 may include a pixel array 400, an analog-to-digital conversion unit ADC 500 and a control unit 600.

The pixel array 400 may include a plurality of unit pixels P 410 arranged in rows and columns. Each of the plurality of unit pixels 410 may generate an analog signal AS having a magnitude corresponding to an intensity of incident light.

The analog-to-digital conversion unit 500 may convert the analog signal AS, which is provided by each of the plurality of unit pixels 410, to a digital signal DS.

The control unit 600 may control an operation of the pixel array 400 using a row selection signal SEL, a reset control signal RX, a long exposure transmission control signal TXL, a short exposure transmission control signal TXS and a ground control signal GX. The control unit 600 may control an operation of the analog-to-digital conversion unit 500 using a control signal CON1.

The control unit 600 may activate the long exposure transmission control signal TXL and the short exposure transmission control signal TXS at the same time. An activated duration of the long exposure transmission control signal TXL may be relatively long, and an activated duration of the short exposure transmission control signal TXS may be relatively short.

In some example embodiments, the pixel array 400 may provide the analog-to-digital conversion unit 500 with the analog signals AS generated by unit pixels 410 located in even columns of the pixel array 400 and with the analog signals AS generated by unit pixels 410 located in odd columns of the pixel array 400 alternately under a control of the control unit 600.

FIG. 12 is a diagram illustrating an example of a pixel array included in an image sensor of FIG. 11.

Referring to FIG. 12, the plurality of unit pixels 410 included in the pixel array 400 may include green pixels G and g, red pixels R and r, and blue pixels B and b that are arranged in a Bayer pattern.

The plurality of unit pixels 410 may include a plurality of long exposure unit pixels G, R, B having a relatively long exposure time and a plurality of short exposure unit pixels g, r, b having a relatively short exposure time.

As illustrated in FIG. 12, the plurality of long exposure unit pixels G, R, B and the plurality of short exposure unit pixels g, r, b may be arranged in a mosaic pattern in the pixel array 400.

Each of the plurality of long exposure unit pixels G, R, B may receive the long exposure transmission control signal TXL from the control unit 600, and each of the plurality of short exposure unit pixels g, r, b may receive the short exposure transmission control signal TXS from the control unit 600.

Each of the plurality of long exposure unit pixels G, R, B may generate the analog signal AS based on incident light received during the relatively long exposure time, and each of the plurality of short exposure unit pixels g, r, b may generate the analog signal AS based on incident light received during the relatively short exposure time. Therefore, a magnitude of the analog signal AS generated by each of the plurality of long exposure unit pixels G, R, B may be different from a magnitude of the analog signal AS generated by each of the plurality of short exposure unit pixels g, r, b for the same incident light.

When the pixel array 400 includes the plurality of long exposure unit pixels G, R, B and the plurality of short exposure unit pixels g, r, b arranged in a mosaic pattern as illustrated in FIG. 12, the image sensor 30 may have a wide dynamic range (WDR) capability such that the image sensor 30 may provide enhanced scene details from shadows to highlights.

The image sensor 30 may operate in a first operation mode or in a second operation mode.

The first operation mode may correspond to a full image mode in which the image sensor 30 generates image data of a high quality, and the second operation mode may correspond to a binning mode in which the image sensor 30 performs a binning operation on neighboring unit pixels of the same color.

FIGS. 13A and 13B are diagrams describing an exemplary operation of an image sensor of FIG. 11 in a second operation mode.

In FIGS. 13A and 13B, a two-by-two (2*2) binning operation, which is performed on four neighboring pixels of the same color that are adjacent in a column direction and in a row direction of each other, is illustrated as an example.

In FIG. 13A, the pixel array 400 is illustrated to include eight rows R0, R1, R2, R3, R4, R5, R6, R7 and eight columns C0, C1, C2, C3, C4, C5 C6, C7 as an example.

In FIG. 13A, each number 1, 2, . . . , 64 in each unit pixel represents a pixel number.

As described above, the plurality of long exposure unit pixels G, R, B and the plurality of short exposure unit pixels g, r, b may be arranged in a mosaic pattern in the pixel array 400. Therefore, as illustrated in FIGS. 13A and 13B, the image sensor 30 may perform a binning operation in the second operation mode such that long exposure binning pixels generated based on the plurality of long exposure unit pixels G, R, B and short exposure binning pixels generated based on the plurality of short exposure unit pixels g, r, b may be arranged in the same mosaic pattern.

For example, as illustrated in FIGS. 13A and 13B, the image sensor 30 may generate one long exposure blue binning pixel using long exposure blue unit pixels 1, 19 without using short exposure blue unit pixels 3, 17 among four unit pixels 1, 3, 17, 19.

Since each of four unit pixels 2, 4, 18, 20 corresponds to the short exposure unit pixel of a green color, the image sensor 30 may generate one short exposure green binning pixel using the four short exposure unit pixels 2, 4, 18, 20.

The image sensor 30 may generate one short exposure blue binning pixel using short exposure blue unit pixels 7, 21 without using long exposure blue unit pixels 5, 23 among four unit pixels 5, 7, 21, 23.

Since each of four unit pixels 6, 8, 22, 24 corresponds to the short exposure unit pixel of a green color, the image sensor 30 may generate one short exposure green binning pixel using the four short exposure unit pixels 6, 8, 22, 24.

In this way, the image sensor 30 may perform the two-by-two binning operation on the pixel array 400 in the second operation mode. Therefore, as illustrated in FIG. 13B, the long exposure binning pixels and the short exposure binning pixels may be arranged in the same mosaic pattern as the mosaic pattern of FIG. 13A.

In FIG. 13A, unit pixels, which are unused in performing the two-by-two binning operation in the second operation mode, are illustrated to have an X mark.

Figure 14:
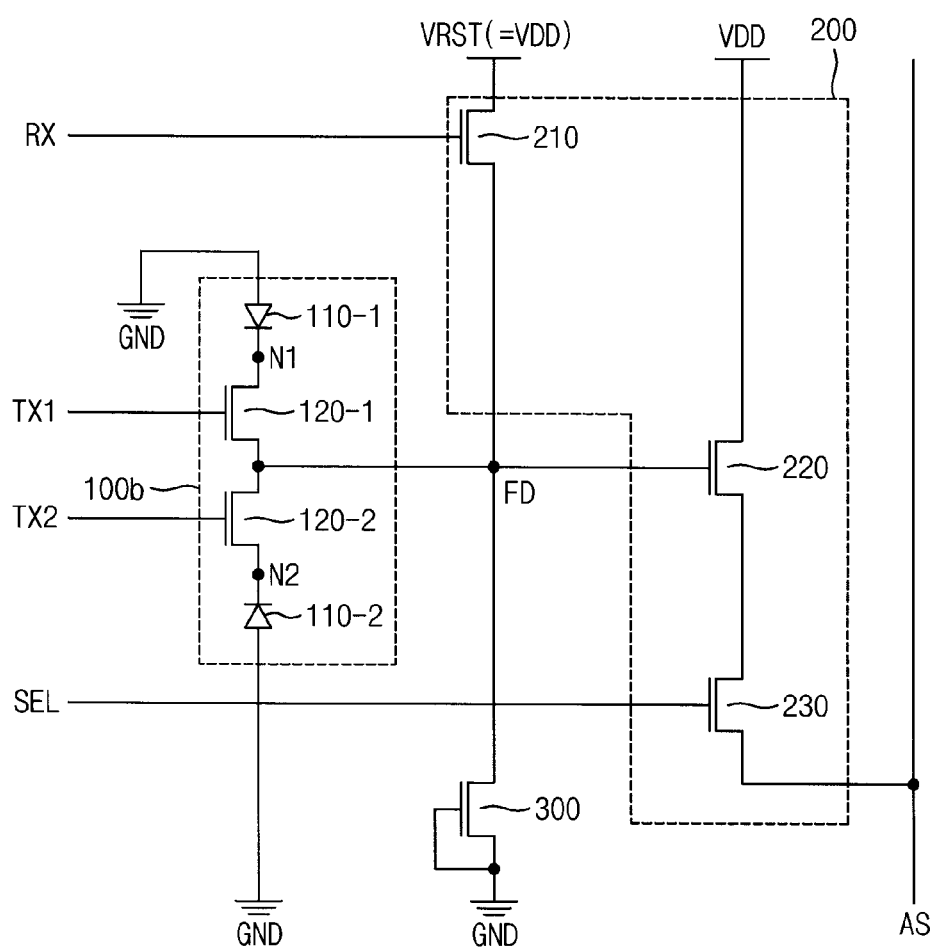
FIGS. 14 and 15 are circuit diagrams illustrating an example of two unit pixels adjacent in a column direction included in an image sensor of FIG. 11.
Figure 15:
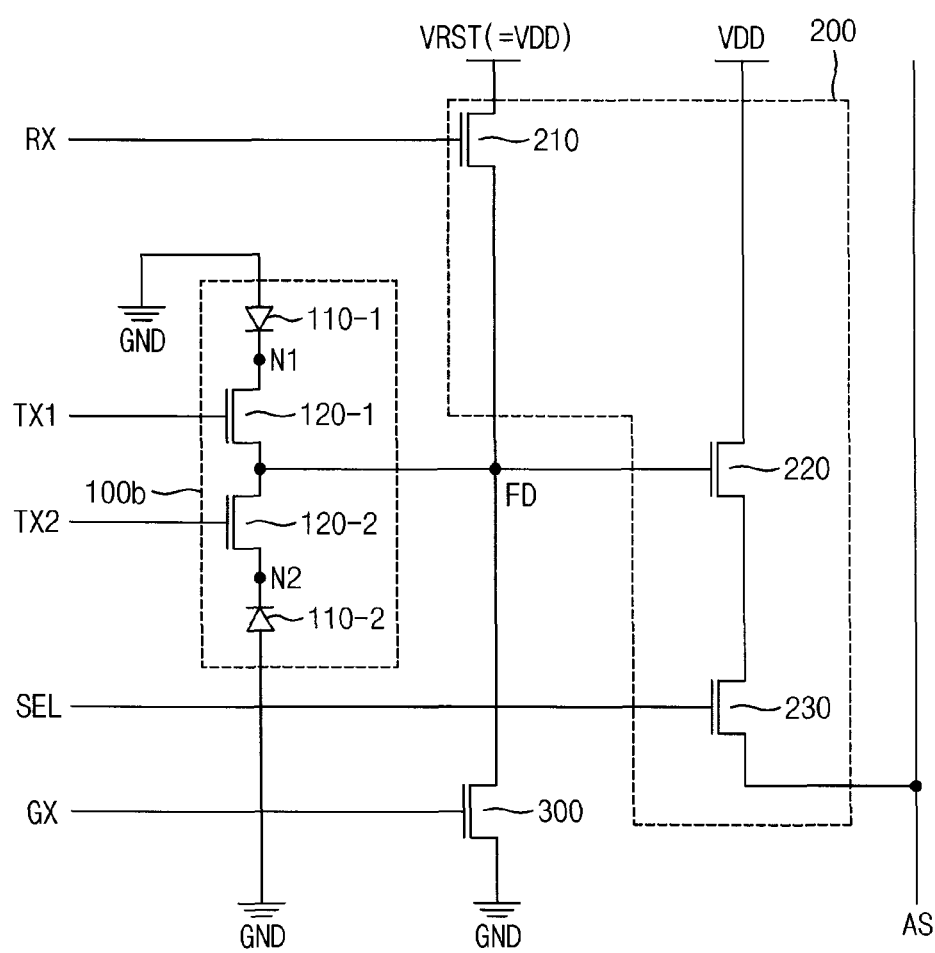

FIGS. 14 and 15 are circuit diagrams illustrating examples of two unit pixels adjacent in a column direction included in an image sensor of FIG. 11.

Referring to FIGS. 11, 14 and 15, two unit pixels 420 among the plurality of unit pixels 410 that are adjacent in a column direction in the pixel array 400 may have the same structure as the structure of FIG. 5. For example, the two unit pixels 420 adjacent in the column direction in the pixel array 400 may share the floating diffusion area FD, the signal generation unit 200 and the ground control transistor 300.

As illustrated in FIGS. 13A and 14, a gate of the ground control transistor 300 may be coupled to the ground voltage GND when the ground control transistor 300 is shared by two unit pixels 420-1, both of which are used in performing the two-by-two binning operation. Therefore, the ground control transistor 300 shared by the two unit pixels 420-1 that are used in performing the two-by-two binning operation may be maintained in a turned off state regardless of a logic level of the ground control signal GX.

As illustrated in FIGS. 13A and 15, a gate of the ground control transistor 300 may receive the ground control signal GX from the control unit 600 when the ground control transistor 300 is shared by two unit pixels 420-2. One of the two unit pixels 420-2 may be used in performing the two-by-two binning operation, and the other of the two unit pixels 420-2 may not be used in performing the two-by-two binning operation. Therefore, the ground control transistor 300 shared by the two unit pixels 420-2, one of which is used in performing the two-by-two binning operation and the other of which is not used in performing the two-by-two binning operation, may be turned on or turned off based on the logic level of the ground control signal GX.

Each of the plurality of long exposure unit pixels G, R, B may receive the long exposure transmission control signal TXL from the control unit 600 as the transmission control signal TX, and each of the plurality of short exposure unit pixels g, r, b may receive the short exposure transmission control signal TXS from the control unit 600 as the transmission control signal TX.

In the first operation mode, the control unit 600 may sequentially select one of the rows included in the pixel array 400, may provide the unit pixels 410 located in even columns of the selected row with the row selection signal SEL, the reset control signal RX, the long exposure transmission control signal TXL, the short exposure transmission control signal TXS and the ground control signal GX according to the timing diagram of FIG. 3, and then may provide the unit pixels 410 located in odd columns of the selected row with the row selection signal SEL, the reset control signal RX, the long exposure transmission control signal TXL, the short exposure transmission control signal TXS and the ground control signal GX according to the timing diagram of FIG. 3.

As such, in the first operation mode, the control unit 600 may maintain the ground control signal GX in the deactivated state, which corresponds to the logic low level. Therefore, the ground control transistor 300 shared by the two unit pixels 420-2 may be turned off. Since the gate of the ground control transistor 300 shared by the two unit pixels 420-1 is coupled to the ground voltage GND, the ground control transistor 300 shared by the two unit pixels 420-1 may be maintained in the turned off state.

Therefore, in the first operation mode, each of the plurality of unit pixels 410 included in the pixel array 400 may generate the analog signal AS having a magnitude corresponding to the intensity of the incident light IL.

The analog-to-digital conversion unit 500 may perform an analog-to-digital conversion on the analog signals AS provided by the pixel array 400 in order to generate the digital signals DS.

In the second operation mode, the image sensor 30 may perform the binning operation on neighboring unit pixels of the same color.

In some example embodiments, in order to perform the two-by-two binning operation in the second operation mode, the control unit 600 may simultaneously select rows of the pixel array 400 including unit pixels 410 on which the two-by-two binning operation is performed, may provide unit pixels 410 located in even columns of the selected rows with the row selection signal SEL, the reset control signal RX, the long exposure transmission control signal TXL, the short exposure transmission control signal TXS and the ground control signal GX according to the timing diagram of FIG. 4, and then may provide unit pixels 410 located in odd columns of the selected rows with the row selection signal SEL, the reset control signal RX, the long exposure transmission control signal TXL, the short exposure transmission control signal TXS and the ground control signal GX according to the timing diagram of FIG. 4.

In some example embodiments, when performing the two-by-two binning operation in the second operation mode, the control unit 600 may provide the ground control signal GX having an activated state, which corresponds to the logic high level, to unit pixels 410 located in even columns of even rows of the pixel array 400 and to unit pixels 410 located in odd columns of odd rows of the pixel array 400, and the control unit 600 may provide the ground control signal GX having a deactivated state, which corresponds to the logic low level, to unit pixels 410 located in odd columns of even rows of the pixel array 400 and to unit pixels 410 located in even columns of odd rows of the pixel array 400.

For example, referring to FIGS. 13A and 13B, when two rows R0 and R2, which correspond to even rows, are selected, the control unit 600 may provide the ground control signal GX having an activated state, which corresponds to the logic high level, to unit pixels 410 located in even columns C0, C2, C4 and C6. Therefore, each of unit pixels 3, 5, 17, 23 included in the two unit pixels 420-2, one of which is used in performing the two-by-two binning operation and the other of which is not used in performing the two-by-two binning operation, may not generate the analog signal AS. In addition, when two rows R0 and R2, which correspond to even rows, are selected, the control unit 600 may provide the ground control signal GX having a deactivated state, which corresponds to the logic low level, to unit pixels 410 located in odd columns C1, C3, C5 and C7. Therefore, each of unit pixels 4, 6, 18, 24 included in the two unit pixels 420-2, one of which is used in performing the two-by-two binning operation and the other of which is not used in performing the two-by-two binning operation, may generate the analog signal AS.

Similarly, when two rows R1 and R3, which correspond to odd rows, are selected, the control unit 600 may provide the ground control signal GX having a deactivated state, which corresponds to the logic low level, to unit pixels 410 located in even columns C0, C2, C4 and C6. Therefore, each of unit pixels 11, 13, 25, 31 included in the two unit pixels 420-2, one of which is used in performing the two-by-two binning operation and the other of which is not used in performing the two-by-two binning operation, may generate the analog signal AS. In addition, when two rows R1 and R3, which correspond to odd rows, are selected, the control unit 600 may provide the ground control signal GX having an activated state, which corresponds to the logic high level, to unit pixels 410 located in odd columns C1, C3, C5 and C7. Therefore, each of unit pixels 12, 14, 26, 32 included in the two unit pixels 420-2, one of which is used in performing the two-by-two binning operation and the other of which is not used in performing the two-by-two binning operation, may not generate the analog signal AS.

Since the rows including unit pixels 410 on which the binning operation is performed are selected at the same time in the second operation mode, an average value of the analog signals AS, which are generated by the unit pixels 410 that are included in the selected rows and are located in the same column, may be provided to the analog-to-digital conversion unit 500.

The analog-to-digital conversion unit 500 may generate the digital signal DS based on the average values received from columns of the pixel array 400 including the unit pixels 410 on which the binning operation is performed.

As described above with reference to FIGS. 11 to 15, since unit pixels, which are not used in performing the binning operation in the second operation mode, do not generate the analog signal AS, the image sensor 30 according to example embodiments may effectively perform the binning operation in the second operation mode while having a wide dynamic range (WDR) capability.

Figure 16:
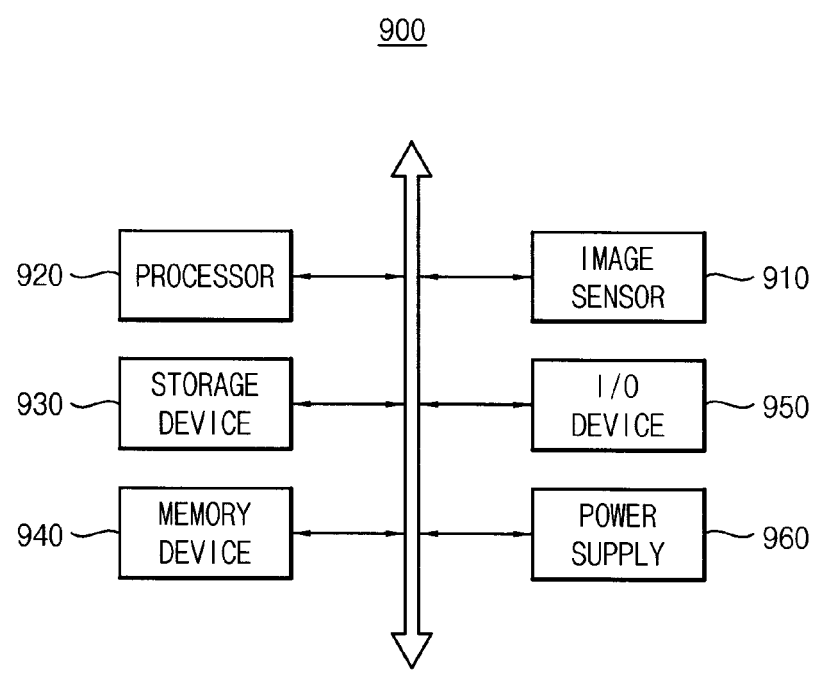
FIG. 16 is a block diagram illustrating a computing system according to an example embodiment.

FIG. 16 is a block diagram illustrating a computing system according to an example embodiment.

Referring to FIG. 16, a computing system 900 may include an image sensor 910, a processor 920 and a storage device 930.

The image sensor 910 may generate a digital signal corresponding to incident light. The image sensor 910 may include a pixel array having a plurality of unit pixels, each of which generates an analog signal corresponding to the incident light, an analog-to-digital conversion unit for converting the analog signal to the digital signal, and a control unit for controlling operations of the pixel array and the analog-to-digital conversion unit. Each of the plurality of unit pixels may include a ground control transistor coupled between a floating diffusion area and a ground voltage and is turned on in response to a ground control signal. When the ground control transistor is turned off, the unit pixel may generate the analog signal. When the ground control transistor is turned on, the unit pixel may not generate the analog signal. Therefore, the image sensor 910 may activate or deactivate each of the plurality of unit pixels by turning off or turning on the ground control transistor included in each of the plurality of unit pixels using the ground control signal.

In certain embodiments, the image sensor 910 may be embodied with one of the image sensor 20 of FIG. 6 and the image sensor 30 of FIG. 11. A structure and an operation of the image sensor 20 of FIG. 6 and the image sensor 30 of FIG. 11 are described above with reference to FIGS. 1 to 15.

The storage device 930 may store the digital signal generated by the image sensor 910. The processor 920 may control operations of the image sensor 910 and the storage device 930.

The computing system 900 may further include a memory device 940, an input/output device 950 and a power supply 960. Although it is not illustrated in FIG. 16, the computing system 900 may further include ports that communicate with a video card, a sound card, a memory card, a universal serial bus (USB) device, or other electronic devices.

The processor 920 may perform various calculations or tasks. According to some embodiments, the processor 920 may be a microprocessor or a CPU. The processor 920 may communicate with the storage device 930, the memory device 940 and the input/output device 950 via an address bus, a control bus, and/or a data bus. In some example embodiments, the processor 920 may be coupled to an extended bus, such as a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc.

The memory device 940 may store data required for an operation of the computing system 900. The memory device 940 may be, for example, a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, a display device, etc. The power supply 960 may supply operational power.

The image sensor 910 may be connected to the processor 920 through one or more of the above buses or other communication links in order to communicate with the processor 920.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). Thus, among other things, the image sensor 910 may be an image sensor chip (e.g., a chip formed from a wafer).

According to example embodiments, the image sensor 910 may be integrated with the processor 920 in one chip, or the image sensor 910 and the processor 920 may be implemented as separate chips.

The computing system 900 may be any computing system including an image sensor. For example, the computing system 900 may include a digital camera, a mobile phone, a smart phone, a portable multimedia player (PMP), a personal digital assistant (PDA), etc.

Figure 17:
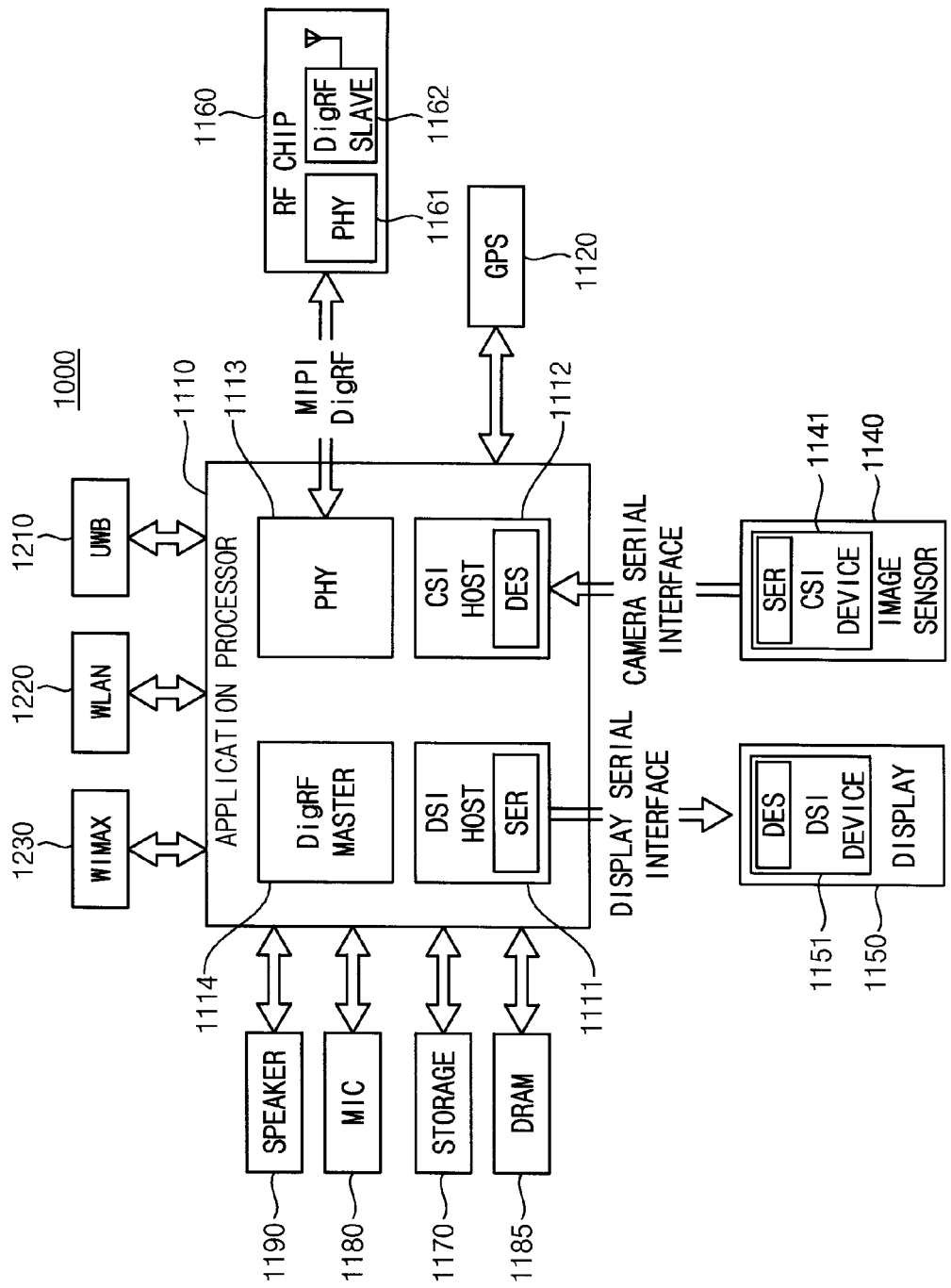
FIG. 17 is a block diagram illustrating an example of an interface used in the computing system of FIG. 16.

FIG. 17 is a block diagram illustrating an example of an interface used in the computing system of FIG. 16.

Referring to FIG. 17, a computing system 1000 may be implemented by a data processing device (e.g., a cellular phone, a personal digital assistant, a portable multimedia player, a smart phone, etc.) that uses or supports a mobile industry processor interface (MIPI) interface. The computing system 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, an MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

The foregoing is illustrative of the present disclosure and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
a plurality of unit pixels arranged in rows and columns, each of the plurality of unit pixels being configured to generate an analog signal corresponding to incident light, each of the plurality of unit pixels being configured to be activated in a first operation mode and to be deactivated in a second operation mode;
an analog-to-digital conversion unit configured to convert the analog signal to a digital signal; and
a control unit configured to control operations of the plurality of unit pixels and the analog-to-digital conversion unit,
wherein each of the plurality of unit pixels includes:
a charge generation unit configured to generate photo-charges in response to the incident light and to provide the photo-charges to a floating diffusion area in response to a transmission control signal;
a signal generation unit configured to generate the analog signal having a magnitude corresponding to an electrical potential of the floating diffusion area based on a reset control signal and a row selection signal; and
a ground control transistor coupled between the floating diffusion area and a ground voltage, the ground control transistor being configured to provide the ground voltage to the floating diffusion area,
wherein the plurality of unit pixels include a plurality of first unit pixels and a plurality of second unit pixels,
a gate of the ground control transistor included in each of the plurality of first unit pixels is coupled to the ground voltage, and
a gate of the ground control transistor included in each of the plurality of second unit pixels is configured to receive a ground control signal.

2. The image sensor of claim 1, wherein the signal generation unit includes:
a reset transistor including a source coupled to the floating diffusion area, a drain coupled to a reset voltage that is higher than the ground voltage, and a gate configured to receive the reset control signal;
a drive transistor including a source, a drain coupled to a supply voltage, and a gate coupled to the floating diffusion area; and
a row selection transistor including a drain coupled to the source of the drive transistor, a gate configured to receive the row selection signal, and a source configured to output the analog signal.

3. The image sensor of claim 1, wherein the plurality of first unit pixels include green pixels, red pixels, and blue pixels that are arranged in a Bayer pattern, and
the plurality of second unit pixels include autofocus pixels that generate autofocus data.

4. The image sensor of claim 1, wherein the plurality of first unit pixels include green pixels, red pixels and blue pixels that are arranged in a Bayer pattern, and
the plurality of second unit pixels include infrared pixels that operate in response to an infrared light signal.

5. The image sensor of claim 1, wherein, in the first operation mode, the control unit is configured to deactivate the ground control signal and the ground control transistor included in each of the plurality of second unit pixels is turned off in response to the deactivated ground control signal, and
in the second operation mode, the control unit is configured to activate the ground control signal and the ground control transistor included in each of the plurality of second unit pixels is turned on in response to the activated ground control signal.

6. The image sensor of claim 5, wherein the first operation mode corresponds to a full image mode, and
the second operation mode corresponds to a binning mode in which the image sensor performs a binning operation on neighboring unit pixels of the same color.

7. An image sensor comprising:
a plurality of unit pixels arranged in rows and columns, each of the plurality of unit pixels being configured to generate an analog signal corresponding to incident light, each of the plurality of unit pixels being configured to be activated in a first operation mode and to be deactivated in a second operation mode;
an analog-to-digital conversion unit configured to convert the analog signal to a digital signal; and
a control unit configured to control operations of the plurality of unit pixels and the analog-to-digital conversion unit,
wherein each of the plurality of unit pixels includes:
a charge generation unit configured to generate photo-charges in response to the incident light and to provide the photo-charges to a floating diffusion area in response to a transmission control signal;
a signal generation unit configured to generate the analog signal having a magnitude corresponding to an electrical potential of the floating diffusion area based on a reset control signal and a row selection signal; and
a ground control transistor coupled between the floating diffusion area and a ground voltage, the ground control transistor being configured to provide the ground voltage to the floating diffusion area,
wherein the plurality of unit pixels are arranged in a Bayer pattern,
the plurality of unit pixels include a plurality of long exposure unit pixels having a first exposure time and a plurality of short exposure unit pixels having a second exposure time the first exposure time being greater than the second exposure time, and
the plurality of long exposure unit pixels and the plurality of short exposure unit pixels are arranged in a mosaic pattern,
wherein two unit pixels among the plurality of unit pixels that are adjacent in a column direction share the floating diffusion area, the signal generation unit and the ground control transistor,
a gate of the ground control transistor is coupled to the ground voltage when the ground control transistor is shared by the two unit pixels that are used in performing a two-by-two binning operation, and
the gate of the ground control transistor is configured to receive a ground control signal when the ground control transistor is shared by a unit pixel that is used in performing the two-by-two binning operation and by a unit pixel that is not used in performing the two-by-two binning operation.

8. The image sensor of claim 7, wherein the plurality of unit pixels are configured to provide the analog-to-digital conversion unit with the analog signal generated by unit pixels located in even columns among the plurality of unit pixels and with the analog signal generated by unit pixels located in odd columns among the plurality of unit pixels alternately.

9. The image sensor of claim 8, wherein, when performing the two-by-two binning operation, the control unit is configured to provide the ground control signal having an activated state to unit pixels located in even columns of even rows among the plurality of unit pixels and to unit pixels located in odd columns of odd rows among the plurality of unit pixels, and configured to provide the ground control signal having a deactivated state to unit pixels located in odd columns of even rows among the plurality of unit pixels and to unit pixels located in even columns of odd rows among the plurality of unit pixels.

10. A portable electronic device comprising:
an image sensor including:
a pixel array including a plurality of unit pixels arranged in rows and columns, each of the plurality of unit pixels being configured to generate an analog signal corresponding to incident light;
an analog-to-digital conversion unit configured to convert the analog signal to a digital signal; and
a control unit configured to control operations of the pixel array and the analog-to-digital conversion unit;
a storage device configured to store the digital signal; and
a processor configured to control operations of the image sensor and the storage device,
wherein each of the plurality of unit pixels is configured to be activated in a first operation mode and to be deactivated in a second operation mode, and
each of the plurality of unit pixels includes:
a charge generation unit configured to generate photo-charges in response to the incident light and to provide the photo-charges to a floating diffusion area;
a signal generation unit configured to generate the analog signal; and
a ground control transistor coupled between the floating diffusion area and a ground voltage,
wherein the plurality of unit pixels include a plurality of first unit pixels and a plurality of second unit pixels,
a gate of the ground control transistor included in each of the plurality of first unit pixels is coupled to the ground voltage, and
a gate of the ground control transistor included in each of the plurality of second unit pixels is configured to receive a ground control signal.

11. The portable electronic device of claim 10, wherein the signal generation unit includes:
a reset transistor including a source coupled to the floating diffusion area, a drain coupled to a reset voltage that is higher than the ground voltage, and a gate configured to receive a reset control signal;
a drive transistor including a source, a drain coupled to a supply voltage, and a gate coupled to the floating diffusion area; and
a row selection transistor including a drain coupled to the source of the drive transistor, a gate configured to receive a row selection signal, and a source configured to output the analog signal.

12. The portable electronic device of claim 10, wherein the plurality of first unit pixels include green pixels, red pixels, and blue pixels that are arranged in a Bayer pattern, and
the plurality of second unit pixels include autofocus pixels that generate autofocus data.

13. The portable electronic device of claim 10, wherein the plurality of first unit pixels include green pixels, red pixels and blue pixels that are arranged in a Bayer pattern, and
the plurality of second unit pixels include infrared pixels that operate in response to an infrared light signal.

14. The portable electronic device of claim 10, wherein, in the first operation mode, the control unit is configured to deactivate the ground control signal and the ground control transistor included in each of the plurality of second unit pixels is turned off in response to the deactivated ground control signal, and
in the second operation mode, the control unit is configured to activate the ground control signal and the ground control transistor included in each of the plurality of second unit pixels is turned on in response to the activated ground control signal.

15. The portable electronic device of claim 14, wherein the first operation mode corresponds to a full image mode, and
the second operation mode corresponds to a binning mode in which the image sensor performs a binning operation on neighboring unit pixels of the same color.

16. The image sensor of claim 1, wherein the charge generation unit includes:
a photoelectric conversion unit configured to generate the photo-charges in response to the incident light and to provide the photo-charges to a first node; and
a transmission transistor including a source coupled to the first node, a drain coupled to the floating diffusion area, and a gate configured to receive the transmission control signal.

17. The image sensor of claim 1, wherein the charge generation unit includes:
a first photoelectric conversion unit configured to generate the photo-charges in response to the incident light and to provide the photo-charges to a first node;
a first transmission transistor including a source coupled to the first node, a drain coupled to the floating diffusion area, and a gate configured to receive a first transmission control signal;
a second photoelectric conversion unit configured to generate the photo-charges in response to the incident light and to provide the photo-charges to a second node; and
a second transmission transistor including a source coupled to the second node, a drain coupled to the floating diffusion area, and a gate configured to receive a second transmission control signal.

* * * * *